Nov. 25, 1969     F. R. SULLIVAN     3,480,756
WELDING APPARATUS
Filed June 20, 1966     3 Sheets-Sheet 1
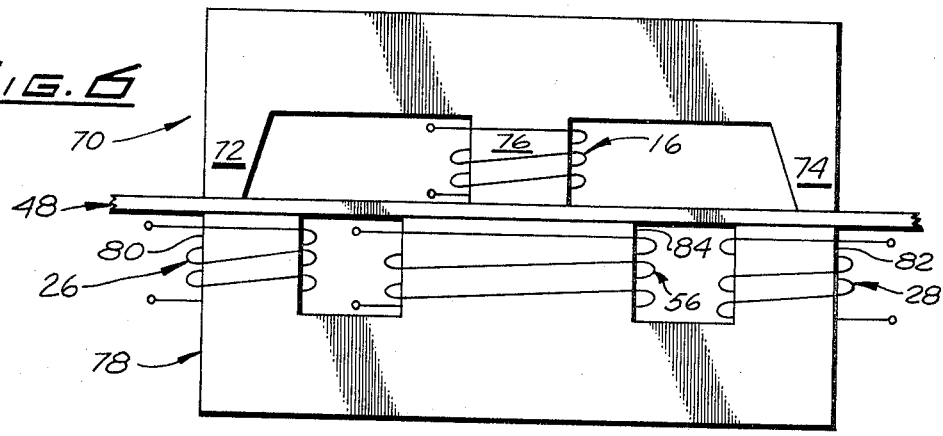
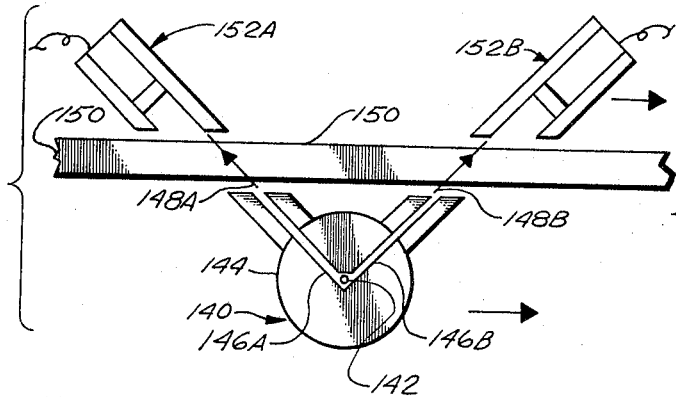
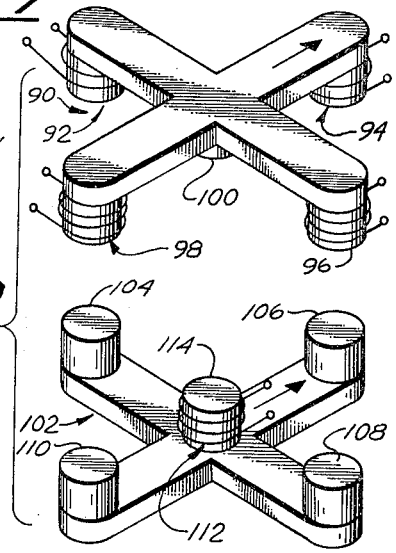
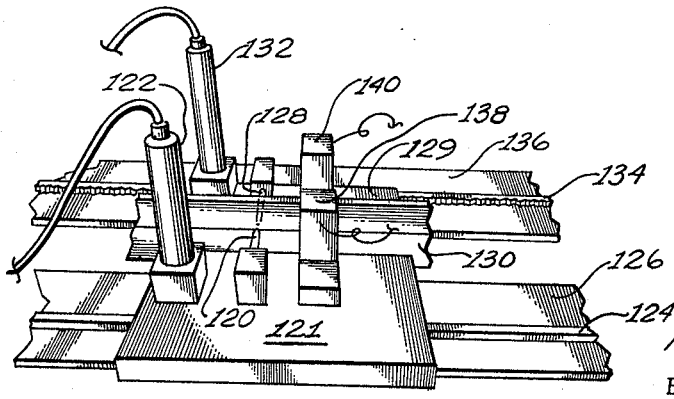
INVENTOR.
FLETCHER R. SULLIVAN
BY
Sidney Magnes Nov. 25, 1969
F. R. SULLIVAN
3,480,756
WELDING APPARATUS
Filed June 20, 1966
3 Sheets-Sheet 2
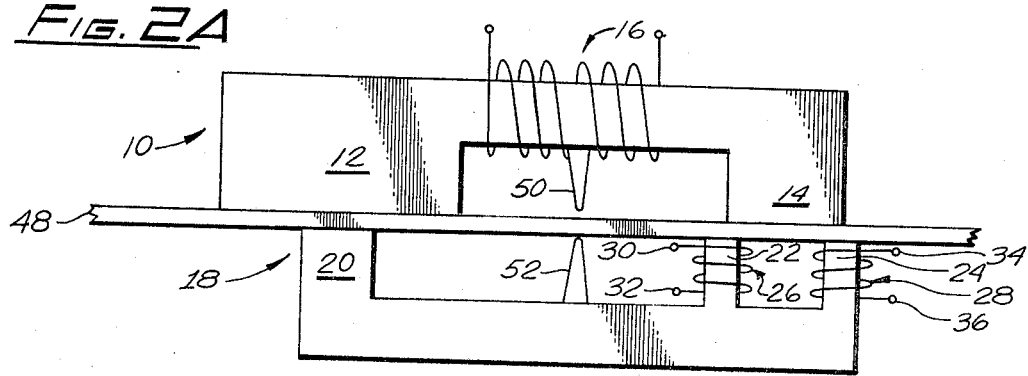
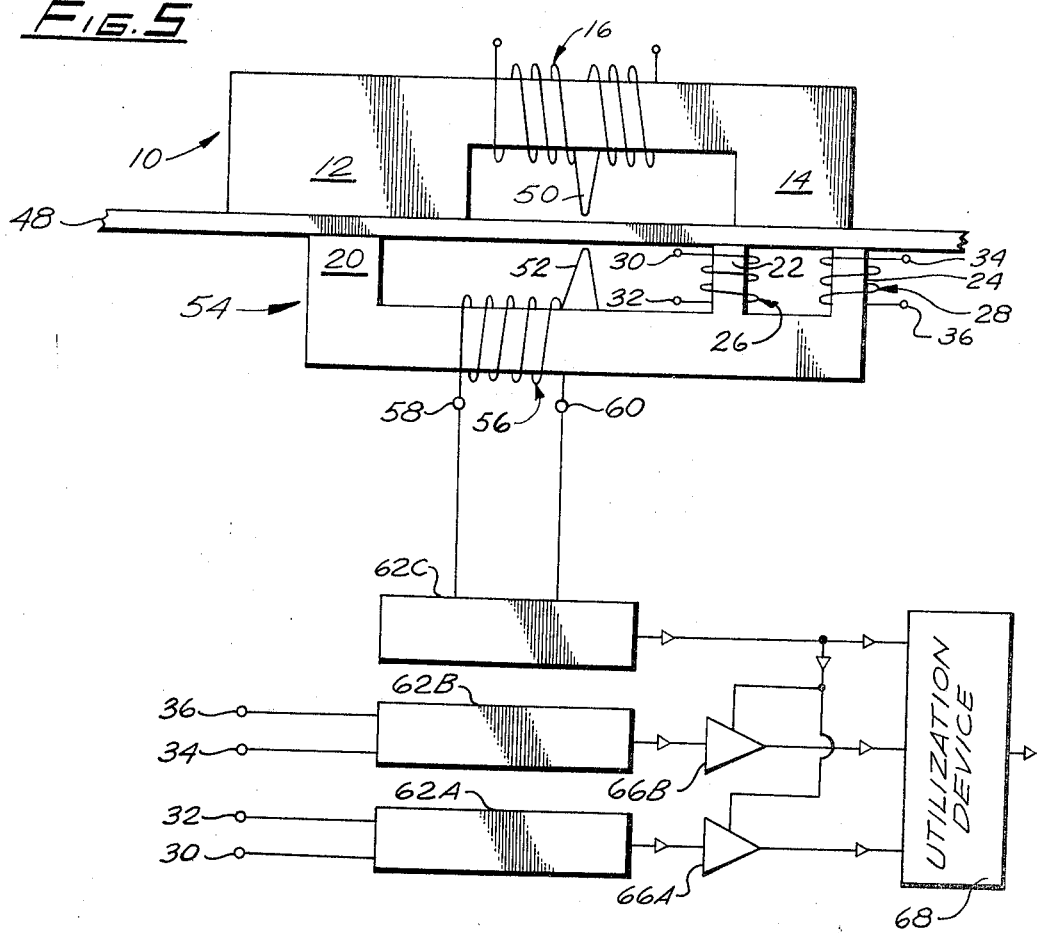
INVENTOR.
FLETCHER R. SULLIVAN
BY Sidney Magnus Nov. 25, 1969

F. R. SULLIVAN 3,480,756

WELDING APPARATUS

Filed June 20, 1966

INVENTOR.
FLETCHER R. SULLIVAN
BY
Sidney Magnes

United States Patent Office 3,480,756
Patented Nov. 25, 1969

3,480,756
WELDING APPARATUS
Fletcher R. Sullivan, Sierra Madre, Calif., assignor to North American Rockwell Corporation, a corporation of Delaware
Filed June 20, 1966, Ser. No. 558,805
Int. Cl. B23k 9/12
U.S. Cl. 219—125    13 Claims

ABSTRACT OF THE DISCLOSURE

This disclosure relates to apparatus and means for the positioning, aligning, and tracking of objects—such as welding electrodes—that are on opposite sides of an opaque structure, such as a wall or a sheet of material. In general, a transmitter is associated with one of the objects, and a sensor is associated with the other object. Depending upon the alignment/misalignment of the transmitter and sensor, suitable signals are produced to indicate the direction and/or the amount of misalignment. These signals may be used as indicators, or as controls for producing the desired alignment—and may be a "tracking" operation when one of the objects is moving. A modification produces another type of signal that indicates the distance between the transmitter and sensor.

BACKGROUND

It is known that for certain welding operations, it is desirable to use a technique known as "opposed-electrode" welding, wherein separate welding electrodes are positioned on opposite sides of the material to be welded; each electrode being adjusted to weld slightly more than halfway through the workpiece. Ordinarily, the workpiece is quite large, and most opposed-electrode welding arrangements require that the large heavy workpiece be fastened in place; and that the electrodes move relative to the workpiece. To achieve this result, the electrodes are usually mounted on individual carriages on opposite sides of the workpiece; and the carriages move along individual guides, or "skates" that aid the electrodes to maintain optimum welding distances from the workpiece. In order to obtain optimum welds, the moving opposed electrodes must always be opposite, or aligned with each other; and must "track" each other's movements. Prior-art attempts to solve this tracking problem have been to move each of the carriages by exactly the same type of motor, gearing, and electrical signals; but this procedure has not been satisfactory—and generally one electrode moved faster than the other electrode, so that they did not produce an optimum weld. An additional complication arises when the workpiece has a curved configuration. Under this condition, one of the electrodes moves along a shorter inner path, while the other electrode moves along a longer outer path; and the outer electrode tends to lag behind the inner electrode.

OBJECTS AND DRAWINGS

It is therefore an object of the present invention to provide improved welding apparatus.

It is another object of the present invention to provide apparatus that causes one welding electrode to track another, moving, electrode. It is a further object of the present invention to provide apparatus that indicates the direction and magnitude of misalignment of two objects.

The attainment of these objects and others will be realized from the teachings of the present application, taken in conjunction with the drawings of which:

FIGURE 1 shows an embodiment of the invention used in a welding arrangement;

FIGURES 2A–2C show the operation of this embodiment;

FIGURE 4 shows an embodiment using gamma-rays;

FIGURE 5 shows another embodiment of the invention, and circuitry for detecting both the misalignment of the objects, and the thickness of an intervening surface; and FIGURES 6 and 7 show other embodiments of the invention.

SYNOPSIS

Figure 2B:
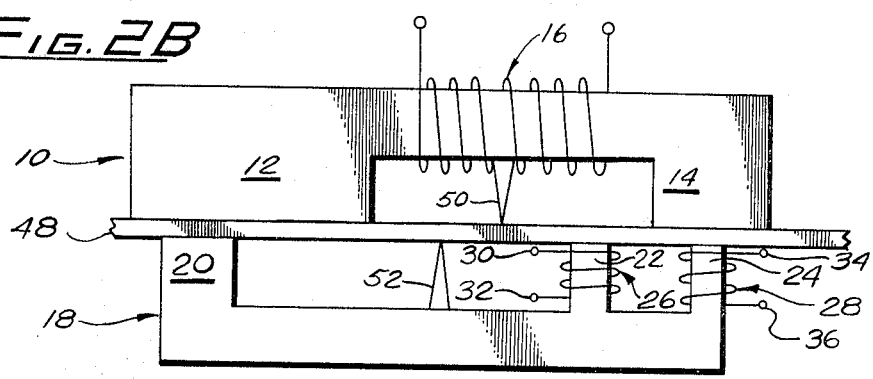

Broadly speaking, the present invention associates a transmitter with the electrode on one side of the workpiece; and associates a sensor—comprising at least two receivers—with the electrode on the opposite side of the workpiece. When the transmitter and the sensor—and thus the objects associated with them—are properly aligned, each of the receivers produces similar signals that—when compared—indicate alignment of the objects. When, however, the objects are not aligned, the receivers produce different signals; and a comparison of these signals indicates the direction and amount of misalignment of the objects. Where desired, the misalignment-signals may be applied to suitable apparatus to produce a movement that provides the desired alignment; or, alternatively, the misalignment-signals may be applied to apparatus that produces a visual or audible signal.

INTRODUCTION

It is well known that many transmitters produce radiations that can be picked up by suitable receivers; these transmitters including magnets, radioactive materials, gamma-ray sources, X-ray sources, ultra-sonic-sources, etc.; the receivers comprising suitably-responsive apparatus. For convenience, the following detailed explanation will first be presented in terms of a magnetic transmitter, since its operation is easily understood.

DESCRIPTION OF THE INVENTION

FIGURE 1 shows such an opposed-electrode welding arrangement using the present invention. Here a primary welding electrode 120 is mounted on a carriage 121 that is driven by means of a suitable primary motor 122 and gears (not shown) that engage the teeth of a first rack 124, to move the primary carriage 121; a first guide 126 being used to guide the primary carriage 121. The welding current, arc-length, motor-speed, etc., are predetermined in the well-known manner. A tracking electrode 128, mounted on a similar tracking carriage 129, is positioned on the other side of workpiece 130, and is similarly driven by a tracking motor 132 and gears that move the tracking carriage along a second rack 134; a second guide 136 being used to guide tracking carriage 129.

However, rather than trying to match the movements of the primary and tracking electrodes in the prior-art manner, the present invention mounts a transmitter 138 and sensor 140, on the primary and tracking carriages. In accordance with the teachings of the present invention, misalignment signals from sensor 140 are applied to a utilization device that senses the instantaneous direction and amount of misalignment of the transmitter and sensor, and thus the direction and amount of misalignment of the welding electrodes 120, 128. The output signal from the utilization device is used to either increase or decrease the speed of tracking motor 132; or, alternatively, to drive tracking motor 132 directly. In this way, the tracking electrode 128 precisely tracks the primary electrode 120 at all times, despite the fact that it is on the opposite side of the material being welded.

In those cases where the workpiece has a curved configuration, and one of the electrodes moves along an inner track, while the other electrode moves along the outer track, the outer electrode tends to fall behind the inner electrode; but the described arrangement senses this condition, and—depending upon the setup—either accelerates the outer electrode's movement, or slows down the movement, of the inner electrode. Thus, the disclosed apparatus causes the opposed electrodes to track properly at all times; and, in this way, provide optimum welding positioning.

The operation of the transmitter and sensor will be understood from FIGURE 2A. This shows a transmitter 10 comprising a substantially U-shaped bar of ferro-magnetic material that can be readily magnized; U-shape transmitter 10 having two "flux" poles 12 and 14. As is well known, when transmitter 10 is magnetized, by means such as an electric coil 16, transmitter 10 becomes a magnet, and flux poles 12 and 14 becoming the points at which magnetic flux enters and leaves transmitter 10. If electric coil 16 is energized by an alternating current, transmitter 10 becomes an alternating-current (electro) magnet.

It is also known that if a "shorting" bar of ferro-magnetc material is shunted across poles 12 and 14, the magnetic flux from transmitter 10 would prefer to travel through the shorting bar—which has a low "reluctance" to the flow of magnetic flux—rather flowing through the air which has a higher reluctance to the flow of magnetic flux. FIGURE 2A shows such a specialized shorting-bar that acts as a sensor. Here a sensor 18 comprises a tripole E-shaped shorting-bar having a single flux pole 20 at one end, and having two spaced-apart auxiliary poles 22 and 24 at the other end—the two auxiliary poles and the stem of sensor 18 forming an F-shaped configuration.

When flux pole 14 of transmitter 10 is symmetrically aligned with respect to auxiliary poles 22 and 24 of sensor 18, as shown in FIGURE 2A, the alternating magnetic flux at pole 14 of transmitter 10 splits equally between the two low-reluctance paths formed by flux pole 14 of transmitter 10, and auxiliary poles 22 and 24 of sensor 18; and the total magnetic flux flows through the stem of sensor 18, and through flux poles 20 and 12 to complete the magnetic-flux flow-path.

As shown, auxiliary poles 22 and 24 are wound with individual electric pickup coils, 26 and 28 respectively; and the flow of alternating magnetic flux through auxiliary poles 22 and 24 causes coils 26 and 28 to produce alternating-current output signals. Since—under the above-described aligned condition—auxiliary poles 22 and 24 conduct substantially the same amount of magnetic flux, their respective pickup coils 26 and 28 produce substantially equal output electrical signals, which appear at terminals 30, 32, and 34, 36 respectively; and are applied to a suitable utilization circuit. Thus, when sensor 18 is aligned opposite transmitter 10, equal output signals are produced by the receiver pickup coils.

Assume now that sensor 18 is not positioned opposite transmitter 10, but is misaligned leftward, as hown in FIGURE 2B. Under this condition, most of the magnetic flux at flux pole 14 of transmitter 10 goes through the outer auxiliary pole 24; and therefore coil 28 of auxiliary pole 24 produces a larger output signal than coil 26 on auxiliary pole 22.

Figure 2C:
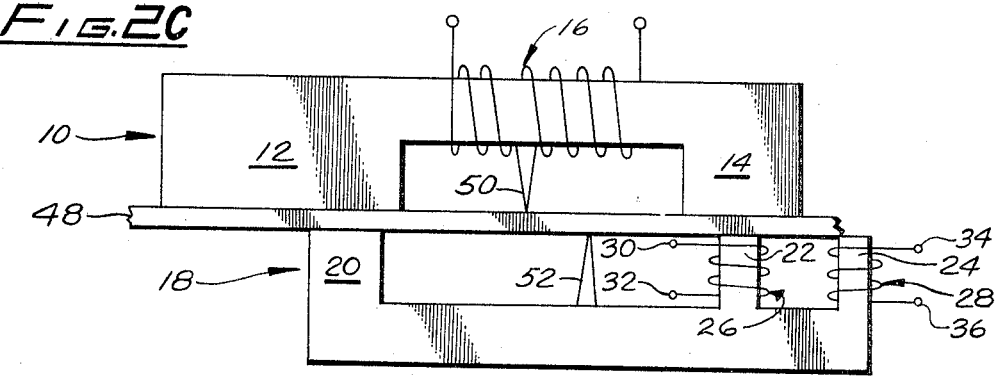

Under those conditions where the misalignment is in the other direction, as shown in FIGURE 2C, auxiliary pole 22 receives most of the magnetic flux; and its receiver coil 26 therefore produces a larger output signal than is produced at receiver coil 28 of the other auxiliary pole 24. It should be noted that flux pole 12 of the transmitter 10 is large enough to accommodate the extreme positions of flux pole 20 of the sensor.

It may thus be understood that the relative outputs of pickup coils 26 and 28 indicate whether the transmitter and sensor are in alignment, or in misalignment; and their output signals are also indicative of the amount and direction of misalignment.

Figure 3:
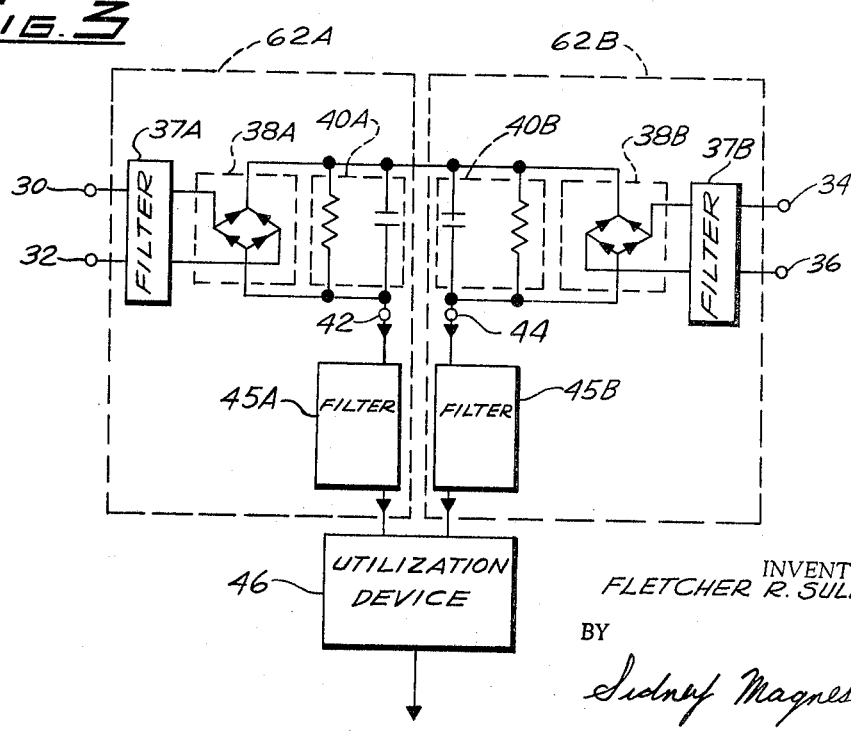
FIGURE 3 shows circuitry for detecting misalignment of the objects.

Referring now to FIGURE 3, there is shown electrical circuitry 62A and 62B for interpreting the output signals from receiver coils 26 and 28 of sensor 18. It will be seen that the output signals from pickup coil terminals 30, 32 and 34, 36 are applied to respective filters 37A and 37B, which assure (in a manner to be discussed later) that signals of spurious frequencies are trapped. The useful signals traverse the filters, to be applied to associated full-wave rectifiers 38A and 38B, which convert the alternating-current input signals to rectified DC signals; the DC signals in turn being applied to circuits 40A and 40B that stabilizes the DC signals. One output signal appears at terminal 42, and the other output signal appears at terminal 44. The difference between these signals is applied, through ripple-eliminating filters 45A and 45B to a utilization device 46—such as a differential amplifier—whose output corresponds to the direction and magnitude of misalignment.

It has been found that in some locations, there are frequently a number of alternating-current magnetic fields, due to electrical leakage from proximal equipment. In order to obviate the effects of these spurious fields on the described apparatus, the energizing coil 16 of the transmitter is energized by signals of a given frequency; and filters 37A and 37B are designed to pass only signals of this given frequency. Thus, even though the receiver coils 24 and 26 may produce signals of spurious frequencies, these spurious signals are trapped by filters 37; and only signals having the correct frequency are passed on to the subsequent circuitry.

In this way the transmitter and sensor cooperate to produce misalignment signals that are used to control the operation of the tracking motor. Thus, the carriages and the opposed electrodes track each other during the welding operation, even though the workpiece is curved, and the carriages have to traverse paths of different lengths.

It is well known that most materials transmit magnetic flux, and the above arrangement has been used satisfactorily for welding aluminum and materials other than iron; iron being one of the materials that inherently short-circuits the path of magnetic flux, and thus prevents the magnetic flux from reaching the sensor. In those cases where iron or other material having a low magnetic reluctance is to be opposed-electrode welded, the apparatus—rather than using magnetism—uses either X-ray radiations or gamma-rays and suitable receivers whose outputs are sensitive to these radiations.

A gamma-ray apparatus is shown in FIGURE 4. Here the transmitter 140, mounted on one carriage (not shown), comprises a gamma-ray source 142, positioned in a lead shield 144 having two gamma-ray escape tunnels, or collimators, 146A and 146B. As a result, two thin streams 148A and 148B of gamma-rays traverse the iron workpiece 150 to be welded. The sensor comprises two receivers 152A and 152B, such as scintillation counters, that are mounted on another carriage (not shown), and positioned so that gamma-ray streams 148A and 148B just graze complementary surfaces of the receivers 152A and 152B.

In operation, if the transmitter and sensor carriages are both moving to the right in a properly-aligned tracking manner, both receivers 152A and 152B produce equal output signals. However, if the transmitter 142 should advance relative to the sensor, receiver 152A will have its gamma-ray stream 148A blocked, and will produce a reduced output signal; while receiver 152B will receive the entire gamma-ray stream 148B at a more sensitive portion of the receiver, and will produce a larger output signal. The difference in the output signals causes a utilization device of the type previously described, to produce a control signal that adjusts the speed of one of the carriage motors; and causes the transmitter and sensor—and thus the two opposed electrodes—to again track each other in an aligned manner.

Conversely, if the transmitter falls behind the sensor, receiver 152A will receive its gamma-ray stream 148A, and receiver 152B will have its gamma-ray 148B blocked. As a result, the utilization device will now produce a control signal of the opposite sense, and this signal will adjust the motor speeds to again produce tracking. In this way, the teachings of the present invention can be used for opposed-electrode welding of an iron workpiece.

Another, constantly recurring problem is that of positioning, or aligning, two points or objects on opposite sides of an opaque wall. This situation arises in many instances; such as when drilling a hole for feeding a wire through the wall, locating a bracket or a similar device opposite a predetermined marking on the opposite surface of a structure, positioning dangerous materials in a hostile environment or behind a protective envelope, aligning the stationary electrodes of a welding machine, etc. In the past, the solution to this problem generally involved human spatial judgement, or required careful measuring from a predetermined point; but due to human error and the difficulties and the tolerances of measurements, the results were not always satisfactory.

The present invention may be used to solve the above problems in the following manner. Referring back to FIGURES 2A, 2B, and 2C, transmitter 10 may be positioned on one side of a wall 48, so that a pointer 50 is at the desired location. Sensor 18 is then moved until its output signals cause a utilization device, such as a meter, to indicate that sensor 18 is aligned with respect to transmitter 10. At that time, pointer 52 of sensor 18 is opposite pointer 50 of transmitter 10, despite the intervening wall 48. Pointers 50 and 52 then permit their side of the wall to be marked. In this way, two aligned marks are made on opposite sides of the wall, without otherwise marring the wall.

Alternatively, the sensor may be positioned, and the transmitter moved to achieve alignment; as the transmitter does not have as many wires attached thereto.

Referring now to FIGURE 5, there is shown a transmitter 10, and a sensor 54; sensor 54 having a third receiver coil, 56, positioned around its central stem portion, so that it is affected by the total magnetic flux flowing through sensor 54. The output signal from receiver 56 appears at terminals 58 and 60, and is applied to circuitry 62C—which is similar to that shown at 62A and 62B of FIGURE 3. It is well known that most non-metallic materials (wood, plaster, etc.), of which an intervening wall may be made, do not seriously affect the passage of magnetic flux through the wall. However, if the wall is thick, the physical spacing between the transmitter and the sensor reduces the amount of magnetic flux flowing through the sensor, so that the receiver signals are correspondingly weaker.

On the other hand, if the wall comprises a non-magnetic metallic material (aluminum, etc.) these do have a minor effect on the magnetic field, as they tend to attenuate the magnetic flux because of eddy-current effects, edge effects, dispersion or distortion of the magnetic field, etc. Therefore, a thick wall of the above materials will reduce the amount of magnetic flux passing through the sensor; and pickup coils 26, 28, and 56 would produce correspondingly smaller signals at their output terminals 30, 32, and 34, 36, and 58, 60; thus undesirably decreasing the sensitivity of the overall device. In order to compensate for this effect, the signal from circuit 62C controls the gain of amplifiers 66A and 66B, as shown in FIGURE 5.

The overall operation is as follows. A thicker wall reduces the total magnetic flux, so that the output signals of coils 26, 28, and 56 are reduced. The reduced output of coil 56 indicates an increased wall thickness, and is desirable; but the reduced outputs of coils 26 and 28 are undesirable—even though their ratio remains the same. Therefore, the reduced signal from circuit 62C is used to increase the gain of amplifiers 66A and 66B equally. Thus, the effective signals from coils 26 and 28 are amplified to substantially the values they would have for a thin wall, thus maintaining the desired sensitivity. Of course, if the wall-thickness decreases, rather than increases, a correspondingly opposite gain-reduction will be produced.

As shown in FIGURE 5, the signals from circuits 66A, 66B, and 62C are applied to a utilization device 68 that indicates not only the magnitude and direction of any misalignment; but also indicates any appreciable change in thickness of the intervening wall.

Referring back to FIGURES 2A, 2B, 2C, and 5, it may be seen that the flux path through auxiliary pole 22 is slightly shorter than the flux path through auxiliary pole 24. This condition tends to cause auxiliary pole 22 to carry more flux, and its receiver coil 26 tends to produce a larger output signal. The shorter flux-path may produce signal changes that are non-linear with misalignment. To a limited extent, the difference in flux-path lengths can be compensated by adjusting the cross sectional areas of the auxiliary poles, adjusting the number of turns in the receiver coils, introducing variable resistors, etc.; but these types of compensation do not ordinarily overcome the non-linearity effect.

FIGURE 6 shows an improved-linearity arrangement that may be used. Here transmitter 70 has two terminally positioned tapered flux-poles 72 and 74, and a centrally positioned power pole 76 that is energized by a coil 16. Sensor 78 has terminally positioned auxiliary poles 80 and 82, and a central flux-pole 84. The outer edges of poles 80 and 82 are aligned with poles 72 and 74; and upon deviation from alignment, the amount of overlap of the two faces of adjacent poles will vary—thus varying the flux through the poles. As previously described, auxiliary poles 80 and 82 have receiver coils 26 and 28 mounted thereon, and a thickness receiver coil 56 is mounted on central pole 84. When transmitter 70 and sensor 78 are aligned as shown in FIGURE 6, the flux path through each auxiliary pole has the same length; thus minimizing the non-linearity condition discussed in connection with the previous position sensors. Movement of either transmitter 70 or sensor 78 produces differential output signals, as previously discussed.

The previously described arrangements were of the type wherein the maximum sensitivity was in a back-and-forth direction; and the embodiment of FIGURE 7 shows an arrangement that does not have this limitation. This illustration shows a cruciform-shaped sensor 90 having four receivers 92, 94, 96, and 98 at the ends of the sensor arms; these receivers comprising, for example, cylindrical poles and circumjacent pickup coils. A central flux pole 100 is used to complete the flux-flow path in a manner to be described later. In this embodiment, transmitter 102 has a corresponding cruciform shape, with flux-poles 104, 106, 108, and 110 positioned at the ends of the transmitter arms, to correspond spatially with the receivers of sensor 90. The transmitter 102 has, in addition, an energizing coil 112 positioned on a central power pole 114.

The operation of the FIGURE 7 embodiment is as follows. Transmitter 102 is positioned adjacent an intervening wall (not shown) in the same manner as previously described; and sensor 90 is positioned on the other side of the wall—suitable marking indicia, such as arrows, being pointed upwards. When the two units are aligned, the magnetic flux flows from the central power pole 114 of the transmitter through the intervening wall into the central flux-pole 100 of the sensor; along the cruciform arms of the sensor; through receivers 92, 94, 96, and 98; through the intervening wall; into the flux-poes 104, 106, 108, and 110 of the transmitter; along the transmitter arms; and back to central power pole 114. When the transmitter 102 and the sensor 90 are aligned, the same amount of magnetic flux flows through each receiver; and the pickup coils produce equal output signals. A suitable utilization device compares the signals, and indicates that the two units are aligned.

Under misalignment conditions, however, certain receivers will produce larger or smaller signals than others; and the utilization device will then indicate the direction and amount of misalignment in both the up-down and left-right directions. A wall-thickness coil (not shown) may be positioned on the central pole 100 of the sensor, if desired.

Thus, the described apparatus has been shown to the usable for causing opposed-electrodes to track each, and for aligning objects on opposite sides of an opaque intervening wall. It may also be used for positioning or manipulating dangerous objects (such as explosives, radioactive materials, high-speed rotating parts) in a hostile environment, in a protective envelope, or behind shielding walls.

Although the invention has been described and illustrated in detail, it is to be clearly understood that the same is by way of illustration and example only, and is not to be taken by way of limitation; the spirit and scope of this invention being limited only by the terms of the appended claims.

What is claimed is:

1. Apparatus for sensing relative position of first and second welding-electrode members that are relatively movable in a first direction, said members being in a close proximity along the opposite sides of an interposed third member, comprising:
   transmitting means on said first member for transmitting magnetic energy through said third member;
   first and second receiving means on said second member spaced from each other along said first direction for receiving energy transmitted through said third member, and for producing first and second receiver signals; and
   comparison means, responsive to the receiving means, for comparing said first and second receiver-signals, and providing a signal indicating relative position of said transmitting and receiving means—and thus the relative position of said first and second welding-electrodes—in said first direction.

2. The apparatus of claim 1 wherein said third member is a workpiece to be welded,
   said first and second members comprising first and second welding heads mounted on first and second driven carriages for simultaneously welding said workpiece from both sides thereof, and
   means responsive to the signal from said comparison means, for controlling motion of at least one of said carriages to maintain the welding heads in alignment on opposite sides of the workpiece.

3. A position-sensor comprising:
   transmitter means, spatially associated with a first welding-electrode, capable of being positioned on one side of an opaque intervening wall, for projecting magnetic energy through said wall;
   sensor means, spatially associated with a second welding-electrode, responsive to the magnetic energy from said transmitter, and comprising at least two receiver means mutually spaced from each other by a known distance, capable of being positioned on the other side of said opaque intervening wall, for causing each receiver to utilize energy projected through said wall by said transmitter, and for producing a position output signal corresponding to its alignment relative to said transmitter—whereby said sensor means may be moved to minimize the difference between said position output signals, which indicates that said transmitter and sensor are aligned.

4. The combination of claim 3 including utilization means for comparing said position output signals and producing a utilization signal indicative of the direction of misalignment between said transmitter and sensor means.

5. The combination of claim 4, wherein said sensor comprises third receiver means capable of utilizing said projected energy from said transmitter, for producing a wall-thickness output signal indicative of the thickness of said intervening wall.

6. The combination of claim 5 including utilization means for comparing said position output signals and producing a utilization signal indicative of the direction of misalignment; and
   means for causing said wall-thickness indicating signal to compensatingly control the amplitude of said position output signals—whereby the sensitivity of said arrangement is not affected by changes of wall-thickness.

7. The combination of claim 3, including:
   means for energizing said transmitter to produce a magnetic flux;
   said sensor comprising an F-shaped portion wherein the parallel bars of the F define two fixedly-spaced-apart auxiliary poles capable of conducting said magnetic flux; and
   pickup-coil means, positioned circumjacent respective ones of said auxiliary poles, for producing position output signals indicative of the locations of said auxiliary poles relative to one of said flux-poles—whereby said position output signals from said pickup-coil means indicate the misalignment of said auxiliary poles with respect to said one flux pole.

8. The combination of claim 3, including means for energizing said transmitter to produce magnetic flux;
   said sensor comprising at least two terminally-positioned fixedly-spaced-apart auxiliary-poles capable of conducting said magnetic flux; and
   pickup-coil means, positioned circumjacent respective said terminally-positioned auxiliary-poles, for producing position output signals indicative of the location of said auxiliary-poles relative to said flux-poles—for causing said position output signals from said pickup-coil means to indicate the misalignment of said sensor relative to said transmitter.

9. The combination of claim 8 wherein said transmitter has a central power pole, and said energizing means comprises a coil circumjacent said power pole; and
   said sensor comprises a central flux-pole means for completing the flux-flow path.

10. The combination of claim 3 wherein said transmitter comprises a cruciform configuration having a plurality of coplanar poles, one flux-pole positioned at the end of each cruciform-arm, and a power pole positioned at the center of said transmitter cruciform;
    an energizing coil positioned on said central pole;
    said sensor comprising a corresponding cruciform configuration, and having a plurality of coplanar poles, one pole positioned at the end of each cruciform arm, and a flux pole positioned at the center of said sensor cruciform; and
    a pickup-coil positioned on each said cruiform-arm poles—whereby said energizing coil causes energy to be projected from said transmitter flux-poles, and said pickup coils produce position output signals indicative of the alignment of said transmitter and sensor.

11. The combination of claim 3 wherein said transmitter means comprises a gamma-ray source and two angled collimating tunnels for producing two streams of gamma-rays;
    said sensor comprising two scintillation counters positioned to receive respective gamma-ray streams when said transmitter and sensor are aligned—whereby misalignment of said transmitter and sensor causes one counter to produce a larger signal, and causes the other counter to produce a smaller output signal.

12. Apparatus comprising:
    a first, movable, member;
    transmitting means, mounted on said first movable member, for causing signals to penetrate through a second member;

a third, movable, member;

first and second receiving means, mounted on said third movable member, and positioned on the opposite side of second member, said first and second receiving means being spaced from each other along a given direction; and comparison means, responsive to the receiving means, for providing a signal that causes one of said members to track said other member's movements in said given direction.

13. A position-sensor comprising:

transmitter means, capable of being positioned on one side of an opaque intervening wall, for projecting energy through said wall;

first motor means for moving said transmitter means;

sensor means, comprising at least two receiver means mutually spaced from each other by a known distance, capable of being positioned on the other side of said opaque intervening wall, for causing each receiver to utilize projected energy from said transmitter, and for producing a position output signal corresponding to the alignment of the sensor relative to said transmitter;

second motor means for moving said sensor means;

comparator means, responsive to said position output signals for producing a control-signal; and means for applying said control-signal to said second motor means for causing said sensor to track said transmitter.

References Cited

UNITED STATES PATENTS

| | | | |
|---|---|---|---|
| 1,975,997 | 10/1941 | Whitesell | 219—109 |
| 2,921,179 | 1/1960 | Anderson | 219—124 |
| 3,068,386 | 12/1962 | Jaeger et al. | 318—20.720 |
| 3,076,889 | 2/1963 | Enk | 219—125 |
| 3,201,562 | 8/1965 | Anderson | 219—125 |
| 3,204,081 | 8/1965 | Iceland | 219—125 |
| 3,268,805 | 8/1966 | Normando | 219—125 |
| 3,290,479 | 12/1966 | Avedissian | 219—85 |
| 3,299,250 | 1/1967 | Vilkas et al. | 219—124 |
| 3,359,486 | 12/1967 | Brosious | 219—125 |

JOSEPH V. TRUHE, Primary Examiner

W. DEXTER BROOKS, Assistant Examiner

U.S. Cl. X.R.

318—20.720